(12) United States Patent
Chen et al.

(10) Patent No.: US 10,872,257 B2
(45) Date of Patent: Dec. 22, 2020

(54) BARCODE DETECTION METHOD AND BARCODE DETECTION SYSTEM FOR INCREASING DETECTION EFFICIENCY

(71) Applicant: WELTREND SEMICONDUCTOR INC., Hsinchu (TW)

(72) Inventors: Hsuan-Ying Chen, Hsinchu (TW);
Chien-Ming Chen, Hsinchu (TW);
Ming-Feng Wu, Hsinchu (TW);
Hung-Chih Chiang, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 16/836,846

(22) Filed: Mar. 31, 2020

(65) Prior Publication Data
US 2020/0226402 A1    Jul. 16, 2020

Related U.S. Application Data

(63) Continuation-in-part of application No. 16/103,877, filed on Aug. 14, 2018, now Pat. No. 10,650,204.

(30) Foreign Application Priority Data

Jun. 6, 2018 (TW) .................................. 107119409
Dec. 25, 2019 (TW) .................................. 108147519

(51) Int. Cl.
*G06K 7/10* (2006.01)
*G06K 15/12* (2006.01)
(Continued)

(52) U.S. Cl.
CPC ......... *G06K 9/183* (2013.01); *G06K 7/10722* (2013.01); *G06K 7/1413* (2013.01);
(Continued)

(58) Field of Classification Search
CPC .... G06K 2209/01; G06K 9/42; G06K 9/3275; G06K 9/38; G06K 9/00442;
(Continued)

(56) References Cited

U.S. PATENT DOCUMENTS 5,459,492 A * 10/1995 Venkateswar ...... G06K 15/1238
347/253
6,504,948 B1 * 1/2003 Schemmel .............. G06T 7/001
382/149

(Continued)

FOREIGN PATENT DOCUMENTS

CN          105989317 A    10/2016
TW          I286706        9/2007
(Continued)

*Primary Examiner* — Thien T Mai
(74) *Attorney, Agent, or Firm* — Winston Hsu

(57) ABSTRACT

A barcode detection method includes obtaining a gradient of each pixel in an image, generating a gradient phase and a gradient magnitude of each pixel according to the gradient, and binarizing the gradient magnitude of each pixel to generate a binary image, generating a sliding window on the image, sampling the binary image vertically and horizontally within the sliding window to generate the numbers of grayscale value variations in the vertical and horizontal directions, locating the most intensive flip region according to the grayscale variations in the vertical and horizontal directions, locating a core barcode region according to the most intensive flip region, capturing the gradient phase of the pixels in the core barcode region to generate a gradient phase distribution, generating a barcode format detection result according to the gradient phase distribution, and locating the barcode region according to the barcode format detection result.

15 Claims, 12 Drawing Sheets

(51) Int. Cl.
*G06K 9/18* (2006.01)
*G06K 9/20* (2006.01)
*G06T 7/13* (2017.01)
*G06K 7/14* (2006.01)
*G06T 7/90* (2017.01)

(52) U.S. Cl.
CPC ......... *G06K 7/1452* (2013.01); *G06K 9/2063* (2013.01); *G06T 7/13* (2017.01); *G06T 7/90* (2017.01)

(58) Field of Classification Search
CPC ......... G06K 7/10722; G06K 19/06037; G06K 19/06046; G06K 19/14; G06K 19/18; G06K 2009/00738; G06K 2019/06253; G06K 2209/05; G06K 7/10732; G06K 7/10742; G06K 7/10811; G06K 7/14; G06K 7/1413; G06K 7/1417; G06K 7/1447; G06K 7/1452; G06K 9/00134; G06K 9/00724; G06K 9/00751; G06K 9/183; G06K 9/2063; G06K 9/228; G06K 9/3283; G06K 9/36; G06K 9/4604; G06K 9/6218; G06K 9/6267; G06T 7/11; G06T 1/20; G06T 2207/10016; G06T 2207/20036; G06T 2207/20224; G06T 2207/30196; G06T 7/13; G06T 7/174; G06T 7/194; G06T 7/254; G06T 7/70; G06T 7/80; G06T 7/90; G06T 1/0028; G06T 1/005; G06T 1/0057; G06T 1/0064; G06T 2201/0052; G06T 2207/10032; G06T 2207/10132; G06T 2207/20008; G06T 2207/20081; G06T 2207/20208; G06T 2207/20221; G06T 2207/30168; G06T 2207/30212; G06T 2207/30244; G06T 2207/30248; G06T 3/0093; G06T 5/00; G06T 5/001; G06T 5/006; G06T 5/009; G06T 5/20; G06T 5/50; G06T 7/0002; G06T 7/10; G06T 7/73
See application file for complete search history.

(56) References Cited

U.S. PATENT DOCUMENTS

| | | | |
|---|---|---|---|
| 8,763,908 | B1 | 7/2014 | Feldman |
| 9,378,404 | B2 | 6/2016 | Rowe |
| 9,396,422 | B1 | 7/2016 | Benni |
| 2005/0046741 | A1* | 3/2005 | Wu .............. H04N 7/01 348/452 |
| 2007/0086653 | A1* | 4/2007 | Javidi .............. G06K 9/58 382/181 |
| 2011/0234930 | A1* | 9/2011 | Nishida .............. G09G 3/3655 349/33 |
| 2018/0144179 | A1* | 5/2018 | Hatakeyama ........ G06K 9/0061 |
| 2019/0109973 | A1* | 4/2019 | Riza .............. H04N 5/2258 |

FOREIGN PATENT DOCUMENTS

| | | |
|---|---|---|
| TW | 201025152 A1 | 7/2010 |
| TW | 201113815 A1 | 4/2011 |
| TW | I512640 B | 12/2015 |
| TW | I676936 B | 11/2019 |

* cited by examiner

BARCODE DETECTION METHOD AND BARCODE DETECTION SYSTEM FOR INCREASING DETECTION EFFICIENCY

CROSS REFERENCE TO RELATED APPLICATIONS

This application is a continuation-in-part of application Ser. No. 16/103,877, filed on Aug. 14, 2018, which is incorporated by reference herein in its entirety.

BACKGROUND OF THE INVENTION

1. Field of the Invention

The present invention illustrates a barcode detection method and a barcode detection system, and more particularly, the barcode detection method and the barcode detection system for increasing detection efficiency.

2. Description of the Prior Art

With advancements of technologies, various barcodes are gradually adopted in our daily life. Actually, complicate and error-prone text messages are gradually being replaced with the barcodes. Particularly, the barcode can be regarded as an image pattern recognition element set in form of several black bars and white spaces with different widths according to a certain coding rule (i.e., ratios of black and white widths) for bearing some useful information. A common barcode is formed by an image pattern including parallel black bars and white spaces for achieving high reflectivity. The barcode can indicate a country which manufactures a product, a manufacturer of the product, a name of the product, a date the product being manufactured, a classification number of a book, starting and ending locations, any type of messages, or a certain date. Thus, barcodes are available in many fields of applications such as a commodity circulation, a library management, a postal management, and a banking system.

In general, two processes are required to identify the barcode for generating (or say, extracting) meaningful information. The first process is called as a barcode sampling process. The barcode sampling process can use an optical component such as a camera, a scanner, or a laser recognition device for capturing a barcode image. The second process is called as a decoding process. The decoding process can use a lookup table or a decoder for acquiring the meaningful information from the sampled barcode. Generally, before the decoding process is performed, presence of the barcode and a format of the barcode (i.e., a one-dimensional barcode format or a two-dimensional barcode format) are required to be detected first. However, in the image captured by the camera, the presence of the barcode and the format of the barcode can be detected after all pixels of the image are scanned in a row-by-row manner. In other words, when a size or resolution of the image is very high, scanning all pixels of the image for detecting the presence of the barcode and the format of the barcode requires a long processing time. Further, when the barcode detection fails, a pixel scanning process (i.e., the scanning process in the row-by-row manner) has to be executed again. Therefore, such inefficient and time consuming barcode detection method wastes additional system resources.

SUMMARY OF THE INVENTION

The embodiment provides a barcode detection method for detecting a barcode. The method comprises acquiring an image by a camera, acquiring a horizontal gradient and a vertical gradient of each pixel within a range of the image, generating a gradient phase and a gradient magnitude of the each pixel according to the horizontal gradient and the vertical gradient, performing a binarization process to the gradient magnitude of the each pixel within the range of the image for generating a binary image, generating a sliding window in the image, vertically sampling the binary image in the sliding window by using V vertical scan lines for generating V gray level flip counts of the binary image in a vertical direction, horizontally sampling the binary image in the sliding window by using H horizontal scan lines for generating H gray level flip counts of the binary image in a horizontal direction, if V is greater than a first predetermined value and H is greater than a second predetermined value, determining a region covered by the sliding window to be a most intensive flip region, if the region covered by the sliding window is determined to be the most intensive flip region, then expanding the region to cover a core barcode region, acquiring a plurality of gradient phases of all pixels within the core barcode region for generating a gradient phase distribution, generating a barcode format detection result according to the gradient phase distribution, and expanding the sliding window until covering the barcode entirely according to the barcode format detection result. Two adjacent vertical scan lines are separated by N pixels, two adjacent horizontal scan lines are separated by M pixels, and N, M, V and H are positive integers greater than 0.

The embodiment provides a barcode detection system. The system comprises a camera configured to capture an image, a processor coupled to the camera and configured to process the image in order to generate a barcode format detection result, and a memory coupled to the processor and configured to buffer image processing data.

The processor acquires an image captured by the camera, acquires a horizontal gradient and a vertical gradient of each pixel within a range of the image, generates a gradient phase and a gradient magnitude of the each pixel according to the horizontal gradient and the vertical gradient, performs a binarization process to the gradient magnitude of the each pixel within the range of the image for generating a binary image, generates a sliding window in the image, vertically samples the binary image in the sliding window by using V vertical scan lines for generating V gray level flip counts of the binary image in a vertical direction, horizontally samples the binary image in the sliding window by using H horizontal scan lines for generating H gray level flip counts of the binary image in a horizontal direction, determines a region covered by the sliding window to be a most intensive flip region if V and H are greater than predetermined values, expands the region to cover a core barcode region, acquires a plurality of gradient phases of all pixels within the core barcode region for generating a gradient phase distribution, generates a barcode format detection result according to the gradient phase distribution, and expands the sliding window until completely covering the barcode according to the barcode format detection result. N, M, V and H are positive integers greater than 0.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
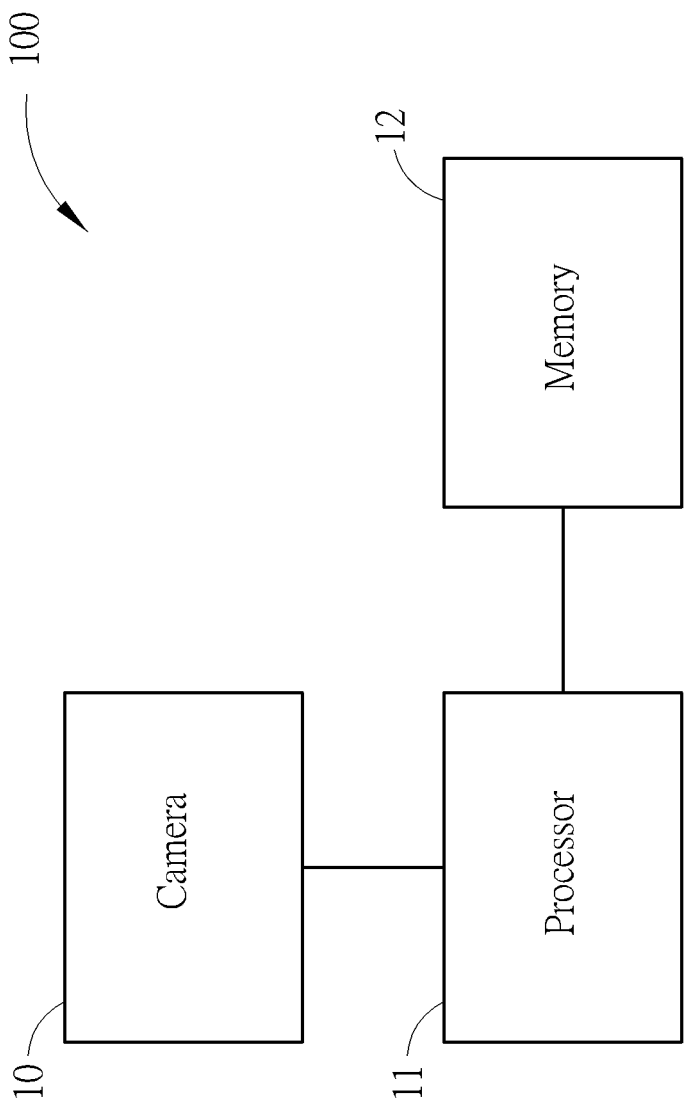
FIG. 1 is a block diagram of a barcode detection system according to an embodiment of the present invention.

FIG. 1 is a block illustration of a barcode detection system 100 according to an embodiment of the present invention. The barcode detection system 100 can be applied to detect one-dimensional barcodes and two-dimensional barcodes. Generally, one-dimensional barcodes have several formats, such as a Universal Product Code (UPC), a European Article Number (EAN) code, an International Standard Book Number (ISBN) code, a Code 39, a Code 93, and a Code 128. Generally, two-dimensional barcodes have several formats, such as a quick response code (QR code), a PDF417 barcode, and a data matrix pattern code. The barcode detection system 100 includes a camera 10, a processor 11, and a memory 12. The camera 10 is used for capturing an image. The camera 10 can include any image capturing device. For example, the camera 10 can include a built-in lens and an optical sensor for capturing an optical signal. Then, the camera 10 can process the optical signal for generating the image. Particularly, the image acquired by the camera 10 can include a barcode image. The processor 11 is coupled to the camera 10 for processing the image in order to generate a barcode format detection result. The processor 11 can be any type of processing device, such as a central processing unit, a microprocessor, a logical operation unit, or a programmable chip. The processor 11 can also determine whether the barcode image can be detected. The memory 12 is coupled to the processor 11 for buffering image processing data. The memory 12 can be any type of data-saving device, such as a hard disk, a random access memory (RAM), or a non-volatile memory. The image processing data saved in the memory 12 can include data of horizontal gradients, vertical gradients, gray level flip counts in a vertical direction, gray level flip counts in a horizontal direction, and a plurality of gradient phase decision boundaries. The image processing data is illustrated later. Steps and principles of a barcode detection method performed by the barcode detection system 100 are also described below.

Figure 2:
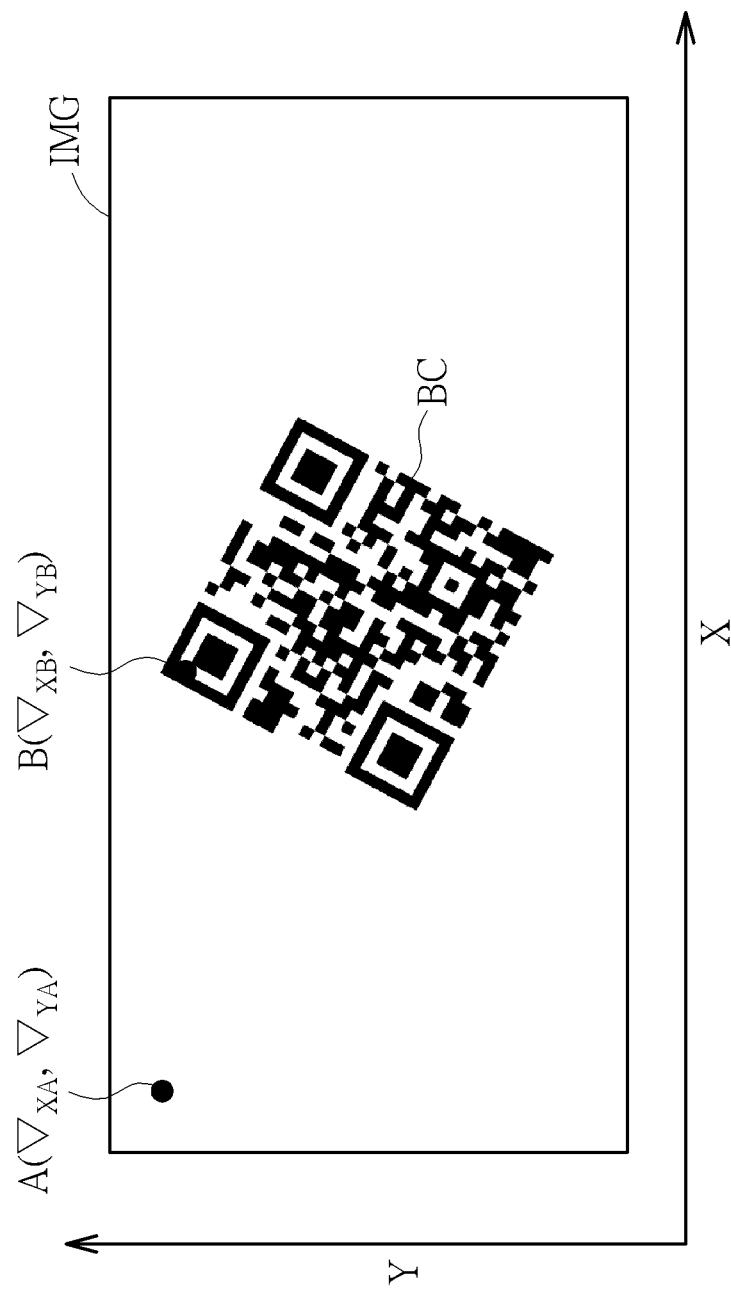
FIG. 2 is an illustration of acquiring a horizontal gradient and a vertical gradient of each pixel within a range of the image.

FIG. 2 is an illustration of acquiring a horizontal gradient and a vertical gradient of each pixel within a range of the image IMG of the barcode detection system 100. As mentioned previously, the camera 10 is capable of capturing the image IMG. Therefore, after the processor 11 receives the image IMG captured by the camera 10, the processor 11 can acquire a horizontal gradient and a vertical gradient of each pixel within the range of the image IMG. For example, the processor 11 can use a Sobel algorithm for acquiring the horizontal gradient and the vertical gradient of the each pixel within the range of the image IMG according to convolution results of a horizontal edge detection filter, a vertical edge detection filter, and brightness of the each pixel within the range of the image IMG. However, the processor 11 can acquire a horizontal gradient and a vertical gradient of each pixel within a "specific" small range of the image IMG for reducing computational complexity. For example, the "specific" small range of the image IMG can be defined as a center region of the image IMG or a cropped region of the image IMG. Any reasonable position or size adjustment of the range of the image IMG falls into the scope of the present invention. For simplicity, the range of the image IMG is defined as a range of full image size hereafter. In the embodiment, the horizontal edge detection filter and the vertical edge detection filter (i.e., invoking the Sobel algorithm) can perform a linear combination operation with a data vector of the each pixel of the image IMG in order to generate the convolution results. Then, the horizontal gradient and the vertical gradient of the each pixel can be generated accordingly. In FIG. 2, the vertical axis is denoted as Y axis. The horizontal axis denoted as X axis. Here, a pixel A is located outside a barcode BC so that surrounding colors of the pixel A are invariant. Therefore, a horizontal gradient and a vertical gradient of the pixel A (i.e., denoted as A ($\nabla_{XA}$, $\nabla_{YA}$)) are small values. However, a pixel B is located inside the barcode BC so that surrounding colors of the pixel B are varied. Therefore, at least one of a horizontal gradient and a vertical gradient of the pixel B (i.e., denoted as B ($\nabla_{XB}$, $\nabla_{YB}$)) is a large value. After the processor 11 acquires all horizontal gradients and vertical gradients of the image IMG, data of all horizontal gradients and vertical gradients can be saved in the memory 12. Then, the processor 11 can generate a gradient phase and a gradient magnitude of the each pixel according to the horizontal gradient and the vertical gradient of the each pixel. For example, when a vertical gradient of a pixel is very large and a horizontal gradient of the pixel is substantially equal to zero, it implies that a gradient phase of the pixel is substantially equal to $\pi/2$. Therefore, surrounding image contours of the pixel are distributed vertically. When a horizontal gradient of a pixel is very large and a vertical gradient of the pixel is substantially equal to zero, it implies that a gradient phase of the pixel is substantially equal to zero. Therefore, surrounding image contours of the pixel are distributed horizontally. Further, the gradient phase and the gradient magnitude of the each pixel can be derived by using a non-linear function with arguments including the horizontal gradient and the vertical gradient. The gradient magnitude is also relevant to gradient. When a pixel has a high gradient, the gradient magnitude of the pixel is large. When a pixel has a low gradient, the gradient magnitude of the pixel is small. The processor 11 can save data of the gradient phases and the gradient magnitudes of all pixels of the image IMG to the memory 12.

Figure 3:
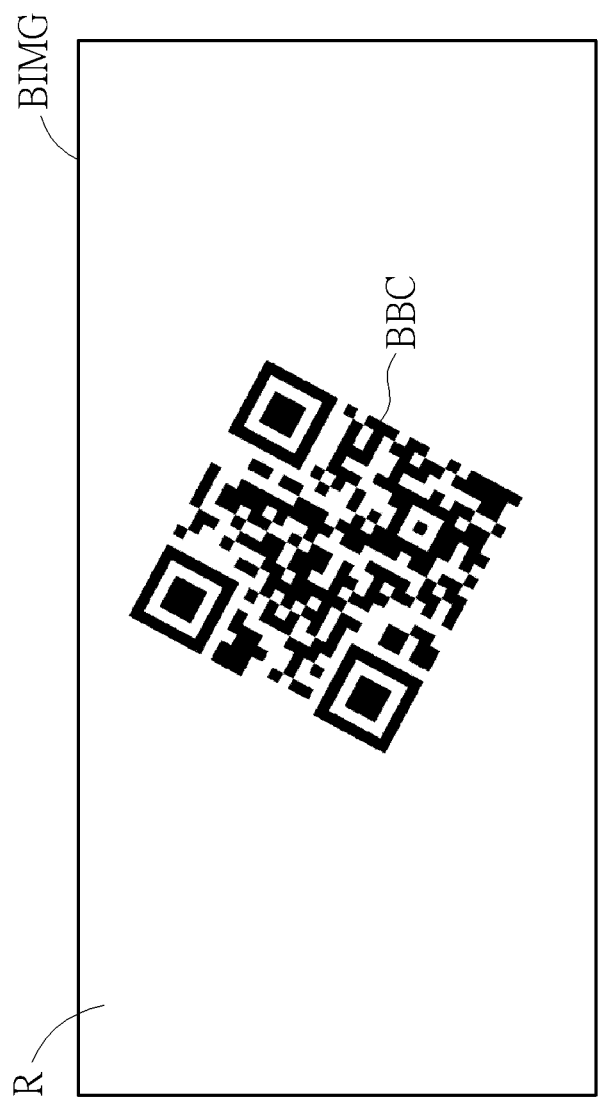
FIG. 3 is an illustration of performing a binarization process to the range of the image.

FIG. 3 is an illustration of performing a binarization process to the range of the image IMG of the barcode detection system 100. As previously mentioned, "the range of the image IMG" can be denoted as the range of full image size for the image IMG. Therefore, an expression of "the range of the image IMG" is simplified as "the image IMG" hereafter. After the processor 11 acquires the gradient phases and gradient magnitudes of all pixels of the image IMG, the processor 11 can compare a threshold value with the gradient magnitude of the each pixel for mapping the gradient magnitude to a first gray level or a second gray level. For example, the processor 11 can set the threshold value before a binarization process is performed. When a gradient magnitude of a pixel is greater than the threshold value, the processor 11 can map the gradient magnitude of the pixel to the first gray level. When a gradient magnitude of a pixel is smaller than the threshold value, the processor 11 can map the gradient magnitude of the pixel to the second gray level. The first gray level can be substantially equal to 255 (i.e., corresponding to white color). The second gray level can be substantially equal to zero (i.e., corresponding to black color). By using the binarization process, the processor 11 can convert the image IMG in FIG. 2 into a binary image BIMG with only two colors. For example, for the binary image BIMG in FIG. 3, a binary barcode BBC has only black and white colors. A region R outside the binary barcode BBC has only white color. After the binarization process is performed, noise interference or color interference can be reduced, improving barcode detection reliability.

Figure 4:
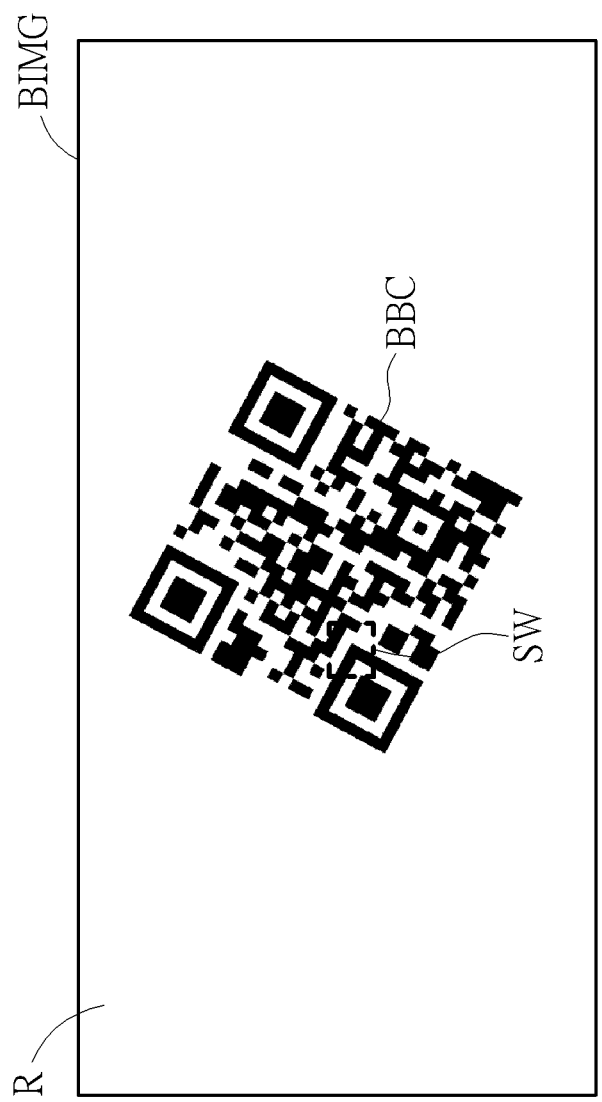
FIG. 4 is an illustration of a sliding window in the binary image of the embodiment.

FIG. 4 is an illustration of a sliding window SW in the binary image BIMG of the embodiment. The processor 11 may generate a sliding window SW in the binary image BIMG, and the initial position of the sliding window SW may be an edge of the binary image BIMG, such as an upper left corner, or any position in the binary image BIMG randomly. The size of the sliding window SW can be a square box of 2×2, 4×4, 5×5 pixels, or a rectangular box, which can be adjusted as needed.

Figure 5:
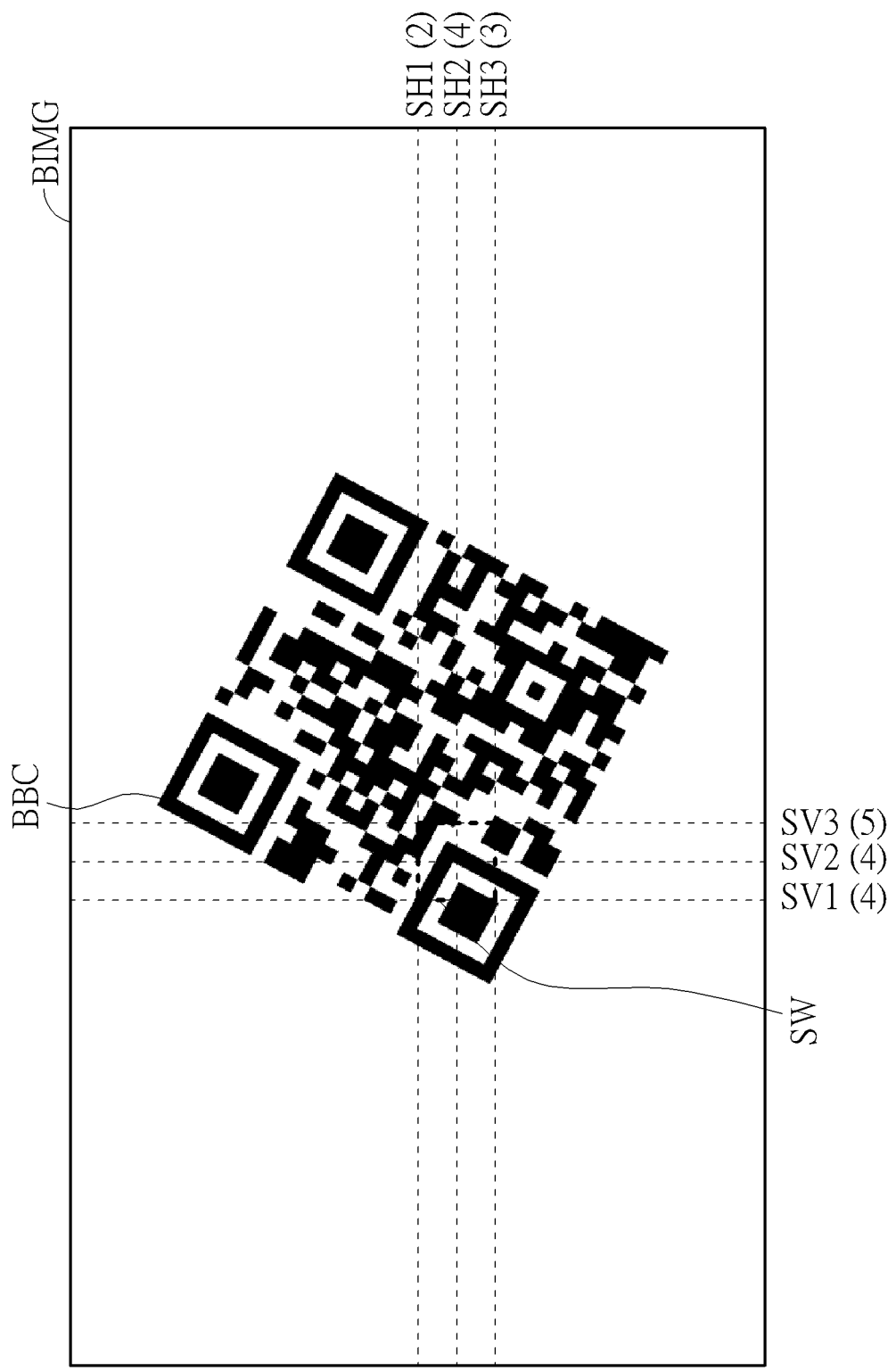
FIG. 5 is an illustration of vertically sampling and horizontally sampling in the sliding window of FIG. 4.

FIG. 5 is an illustration of vertically sampling and horizontally sampling in the sliding window of FIG. 4. In order to reduce the processing time and computational complexity, the barcode detection system 100 can use an interval-based sampling mechanism in the binary image BIMG. For example, the barcode detection system 100 can vertically sample by using V vertical scan lines for generating V gray level flip counts in a vertical direction. Two adjacent vertical scan lines are separated by N pixels. For example, two adjacent vertical scan lines can be separated by 2~4 pixels (i.e., N=2~4). Vertical scan lines SV1 to SV3 can be used for vertically sampling the binary image BIMG in the sliding window SW. Similarly, the barcode detection system 100 can horizontally sample the binary image BIMG by using H horizontal scan lines for generating H gray level flip counts. Two adjacent horizontal scan lines are separated by M pixels. For example, two adjacent horizontal scan lines can be separated by 2~4 pixels (i.e., M=2~4). Horizontal scan lines SH1 to SH3 can be used for horizontally sampling the binary image BIMG in the sliding window SW. However, the present invention is not limited by using specific N, M, V and H. Generally, N, M, V and H are four positive integers greater than 0. Since the interval-based sampling mechanism is introduced to the barcode detection system 100, the processing time and computational complexity can be reduced. Further, N, M, V and H can be adjusted based on requirement of detection quality. For example, when high resolution of the detection quality is required, a vertical sampling interval N and a horizontal sampling interval M can be reduced for increasing the number of vertical scan lines (V) and the number of horizontal scan lines (H). Also, the vertical sampling interval N between two adjacent vertical scan lines and the horizontal sampling interval M between two adjacent horizontal scan lines can be dynamically adjusted. For example, a distribution (or say, allocation) of the V vertical scan lines can be optimized by adjusting the vertical sampling interval N as a variable space parameter between two adjacent vertical scan lines. Similarly, a distribution (or say, allocation) of the H horizontal scan lines can be optimized by adjusting the horizontal sampling interval M as a variable space parameter between two adjacent horizontal scan lines. Therefore, by appropriately adjusting N, M, V and H, the barcode detection system 100 can provide high operational flexibility.

The binary image BIMG may have only white color with the first gray level and black color with the second gray level. Thus, color data of a column or a row of pixels sampled by a single scan line can include color variations of the column or the row of pixels. For example, since horizontal scan lines SH1, SH2, SH3 sample the binary barcode BBC within the sliding window SW, gray level flip counts are detected. The gray level flip counts are 2, 4, 3 respectively, which are shown in the FIG. 5 as SH1(2), SH2(4), SH3(3). Similarly, since vertical scan lines SV1 to SV3 the binary barcode BBC are within the sliding window SW, gray level flip counts are detected. The gray level flip counts are 4, 4, 5 respectively, which are shown in FIG. 5 as SV1(4), SV2(4), SV3(5). Generally speaking, the H gray level flip counts of the binary image BIMG in the horizontal direction are defined as H gray level flip counts switched between the first gray level and the second gray level in the horizontal direction sampled by the H horizontal scan lines. Similarly, the V gray level flip counts of the binary image BIMG in the vertical direction are defined as V gray level flip counts switched between the first gray level and the second gray level in the vertical direction sampled by the V vertical scan lines. The total gray level flip count in horizontal direction in the sliding window SW is the sum of the gray level of horizontal scan lines SH1, SH2, SH3, which is 2+4+3=9. The total gray level flip count in vertical direction in the sliding window SW is the sum of the gray level of vertical scan lines SV1, SV2, SV3, which is 4+4+5=13. If V is greater than a first predetermined value and H is greater than a second predetermined value, the region covered by the sliding window SW is the most intensive flip region. Otherwise, the sliding window SW is moved to cover another region of the binary image BIMG. For example, if the first predetermined value and the second predetermined value are both 8, then the region covered by the sliding window SW is determined to be the most intensive flip region. If the first predetermined value and the second predetermined value are both 9, then the region covered by the sliding window SW is determined not to be the most intensive flip region.

Figure 6:
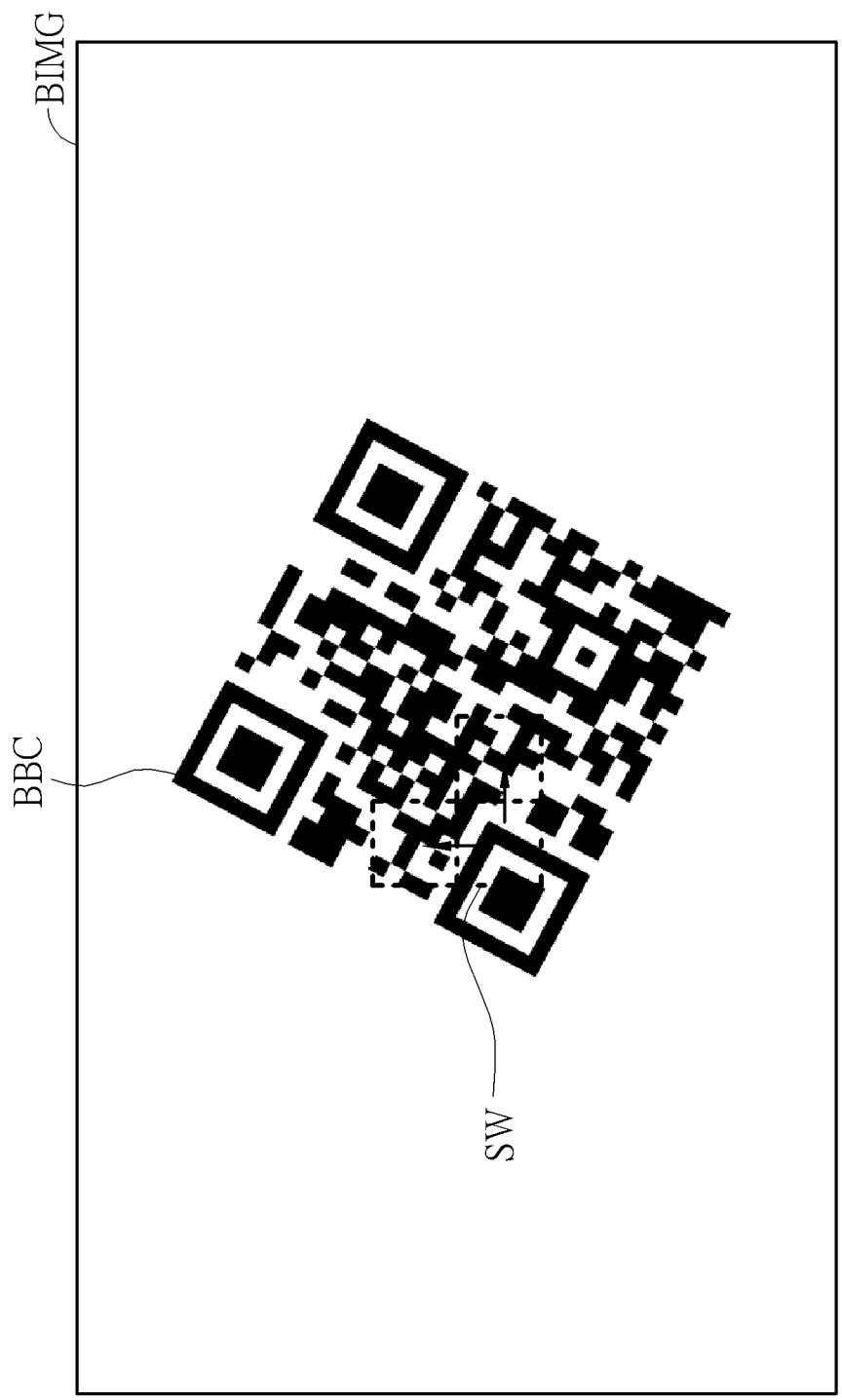
FIG. 6 is an illustration of the moving sliding window of FIG. 4.

FIG. 6 is an illustration of the moving sliding window SW. The sliding window SW can be moved in any way on the binary image BIMG. For example, the sliding window SW can move W pixels horizontally and/or Z pixels vertically. W and Z can be any positive integer greater than 0. When the sliding window SW moves to the next region, the above-mentioned sampling method can be repeated to obtain the gray level flip counts of the binary image BIMG in the sliding window SW. If V is greater than the first predetermined value and H is greater than the second predetermined value, then a region covered by the sliding window is determined to be a most intensive flip region. Otherwise, the sliding window SW is moved to cover another region. This is repeated until the region covered by the sliding window SW is determined to be the most intensive flip region. For example, according to the image parameters, the sliding window SW can be moved upward by 5 pixels and repeat the above-mentioned sampling method.

Figure 7:
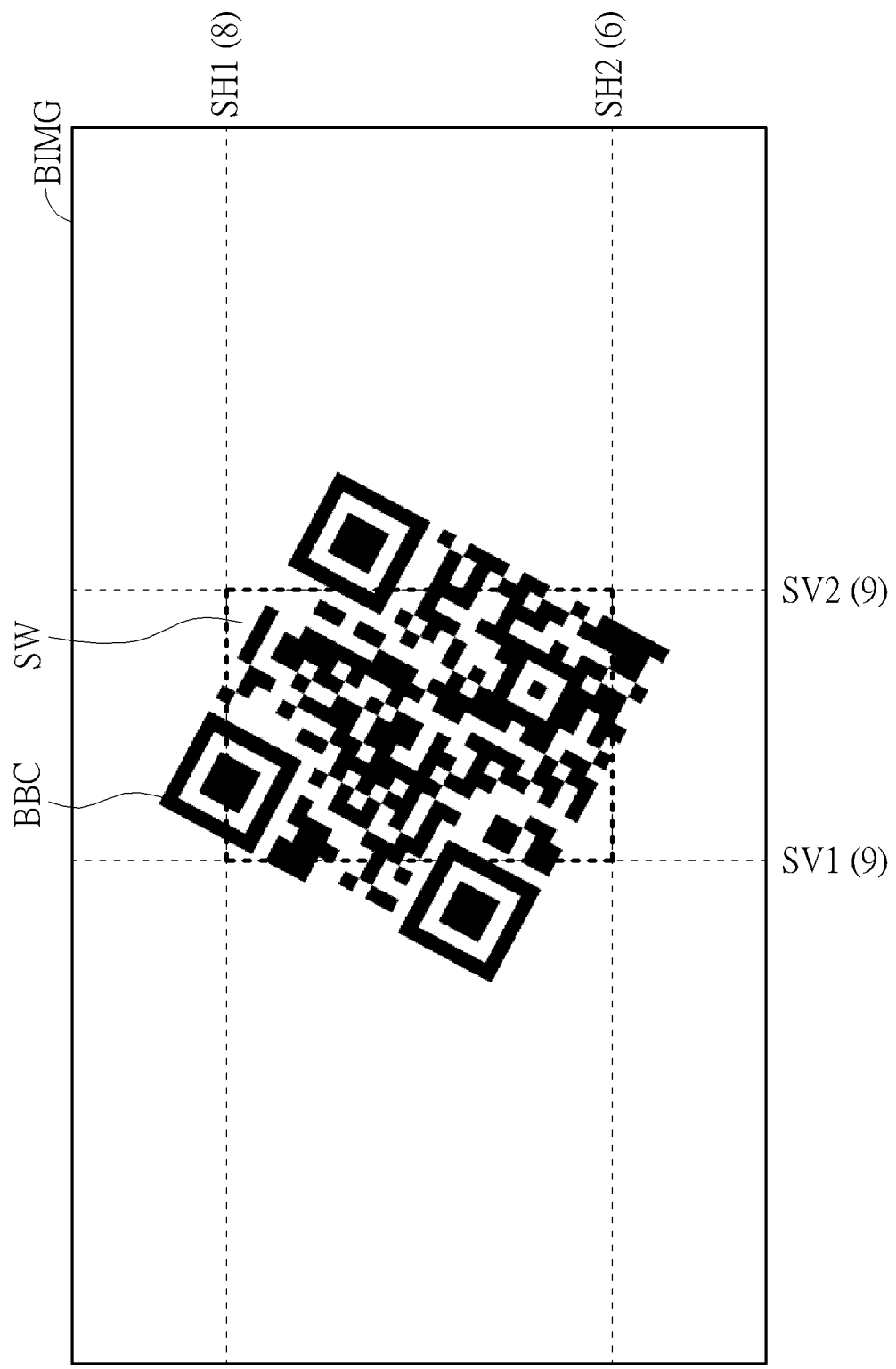
FIG. 7 is an illustration of the sliding window of FIG. 4 covering the core barcode region.

FIG. 7 is an illustration of the sliding window SW covering the core barcode region. After the most intensive flip region is determined, the sliding window SW can begin to expand. The sliding window SW can be expanded in the horizontal direction. The gray level flip counts of the binary image BIMG in the vertical direction are calculated in the expanded region covered by the sliding window SW. If the gray level flip count is greater than a preset value, the sliding window SW is expanded again in the horizontal direction. These steps are repeated until the gray level flip count in the vertical direction in the expanded region is lower than the preset value.

Similarly, the sliding window SW can be expanded in the vertical direction. The gray level flip counts of the binary image BIMG in the horizontal direction are calculated in the expanded region covered by the sliding window SW. If the gray level flip count is greater than a preset value, the sliding window SW is expanded again in the vertical direction. These steps are repeated until the gray level flip count in the horizontal direction in the expanded region is lower than the preset value. Then, the sliding window expansion can stop.

As shown in FIG. 7, if the preset value is 10, the gray level flip count corresponding to the horizontal scan line SH1 is 8, and the gray level flip count corresponding to the horizontal scan line SH2 is 6. Both of which are lower than the preset value. The sliding window SW can stop expanding vertically. The gray level flip count corresponding to the vertical scan line SV1 is 9, and the gray level flip count corresponding to the vertical scan line SV2 is 9. Both of which are lower than the preset value, so the sliding window SW can stop expanding horizontally. The region covered by the sliding SW is the core barcode region.

Figure 8:
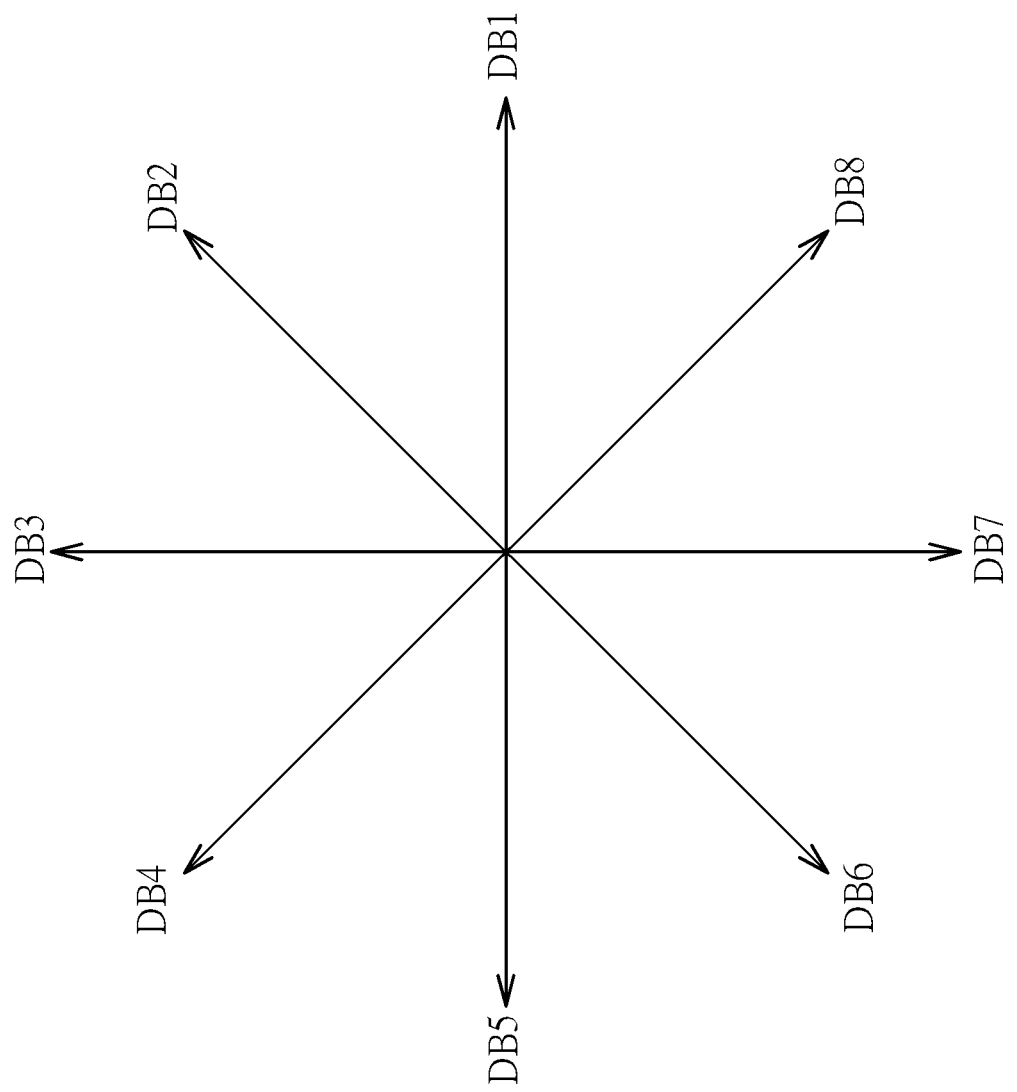
FIG. 8 is an illustration of setting gradient phase decision boundaries.

FIG. 8 is an illustration of setting P gradient phase decision boundaries of the barcode detection system 100. In the barcode detection system 100, the P gradient phase decision boundaries can be predetermined. Two adjacent phase decision boundaries are separated by $2\pi/P$. For example, when P is equal to eight, eight phase decision boundaries are generated by the barcode detection system 100, which are denoted as DB1 to DB8. Here, the phase decision boundary DB1 corresponds to a phase equal to zero. The phase decision boundary DB2 corresponds to a phase equal to $2\pi/8$. The phase decision boundary DB3 corresponds to a phase equal to $4\pi/8$, and so on. As previously mentioned, the processor 11 can generate the gradient phase of the each pixel within the sliding window SW. Therefore, the processor 11 can generate a plurality of decision gradient phases from the gradient phases of all pixels within the sliding window SW by using the P gradient phase decision boundaries. In other words, each gradient phase within the sliding window SW can be quantized as one gradient phase decision boundary of the P gradient phase decision boundaries. Therefore, the decision gradient phases generated by the processor 11 have P possible phase patterns (i.e., P deterministic phases). Here, since each included angle between two edges at a turning point for the two-dimensional barcode is equal to $\pi/2$, P is an even integer greater than four. By doing so, gradient phase characteristics of the two-dimensional barcode within the sliding window SW can be quantized.

Figure 9:
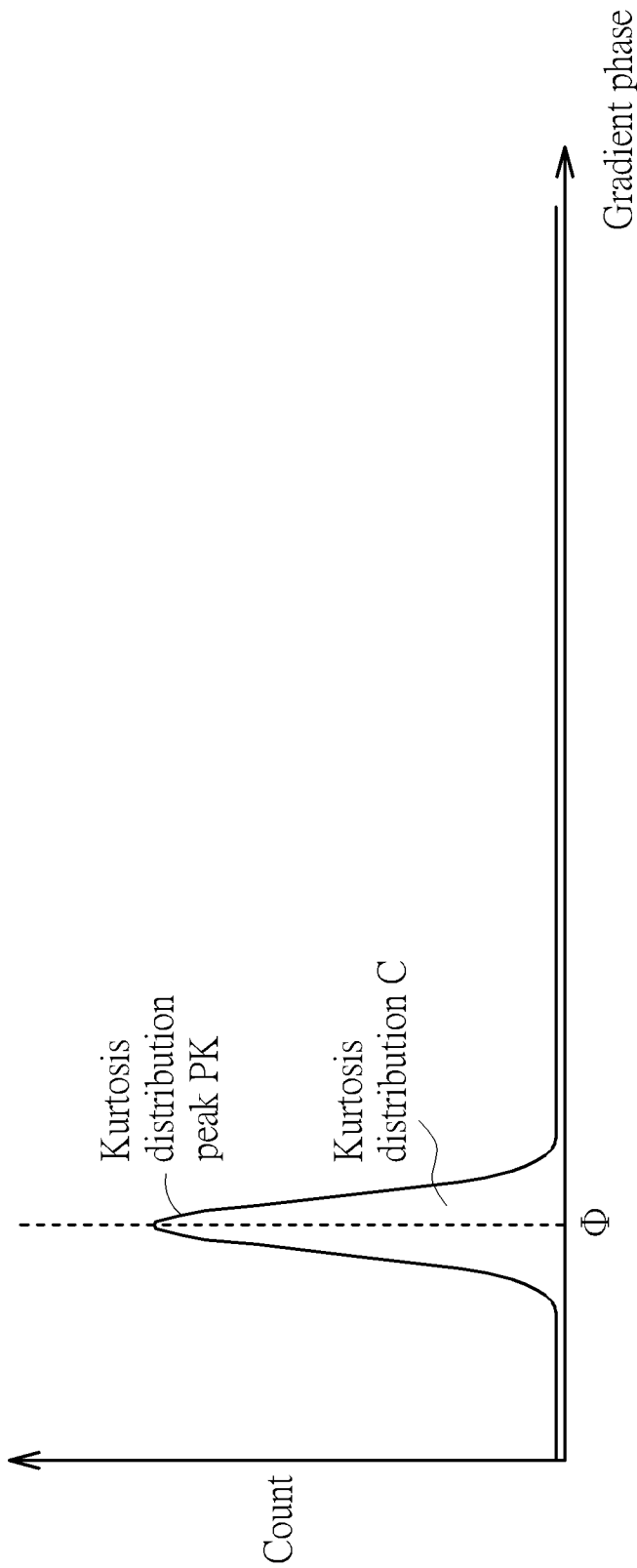
FIG. 9 is an illustration of a gradient phase distribution with only one kurtosis distribution.

FIG. 9 is an illustration of a gradient phase distribution with only one kurtosis distribution C of the barcode detection system 100. As previously mentioned, the processor 11 can generate the plurality of decision gradient phases from the gradient phases of all pixels within the image region by using the P gradient phase decision boundaries. Then, the processor 11 can generate the gradient phase distribution according to the plurality of decision gradient phases. In other words, the processor 11 can perform a statistical analysis process to the plurality of decision gradient phases (i.e., P possible phase patterns) of all pixels within the sliding window SW. For example, the number of decision gradient phases equal to zero (i.e., corresponding to the gradient phase decision boundary DB1) can be counted by the processor 11 according to the plurality of decision gradient phases of all pixels within the image region. Similarly, the number of decision gradient phases equal to $2\pi/8$ (i.e., corresponding to the gradient phase decision boundary DB2) can be counted by the processor 11 according to the plurality of decision gradient phases of all pixels within sliding window SW, and so on. Finally, the gradient phase distribution can be generated by the processor 11. Specifically, the processor 11 can generate the barcode format detection result as a one-dimensional barcode format when the gradient phase distribution has only one kurtosis distribution C, as illustrated below. Since the one-dimensional barcode includes a plurality of bars (with black color) and spaces (with white color) in a single axis, a gradient phase of each pixel of the image corresponds to a single angle. When the image of the one-dimensional barcode is not rotated, the gradient phase of the each pixel corresponds to $\pi/2$. However, in a general case of the image of the one-dimensional barcode being captured by the camera 10, the image may be rotated. When the image of the one-dimensional barcode is rotated, the gradient phase of the each pixel corresponds to $\pi/2+\theta$. $\theta$ is denoted as a rotation phase offset. Therefore, in FIG. 9, when the gradient phase distribution has only one kurtosis distribution C and a phase corresponding to kurtosis distribution peak PK is substantially equal to $\Phi$, the barcode can be detected as the one-dimensional barcode by the processor 11. The rotation phase offset $\theta$ can be derived as $\Phi-\pi/2$.

Figure 10:
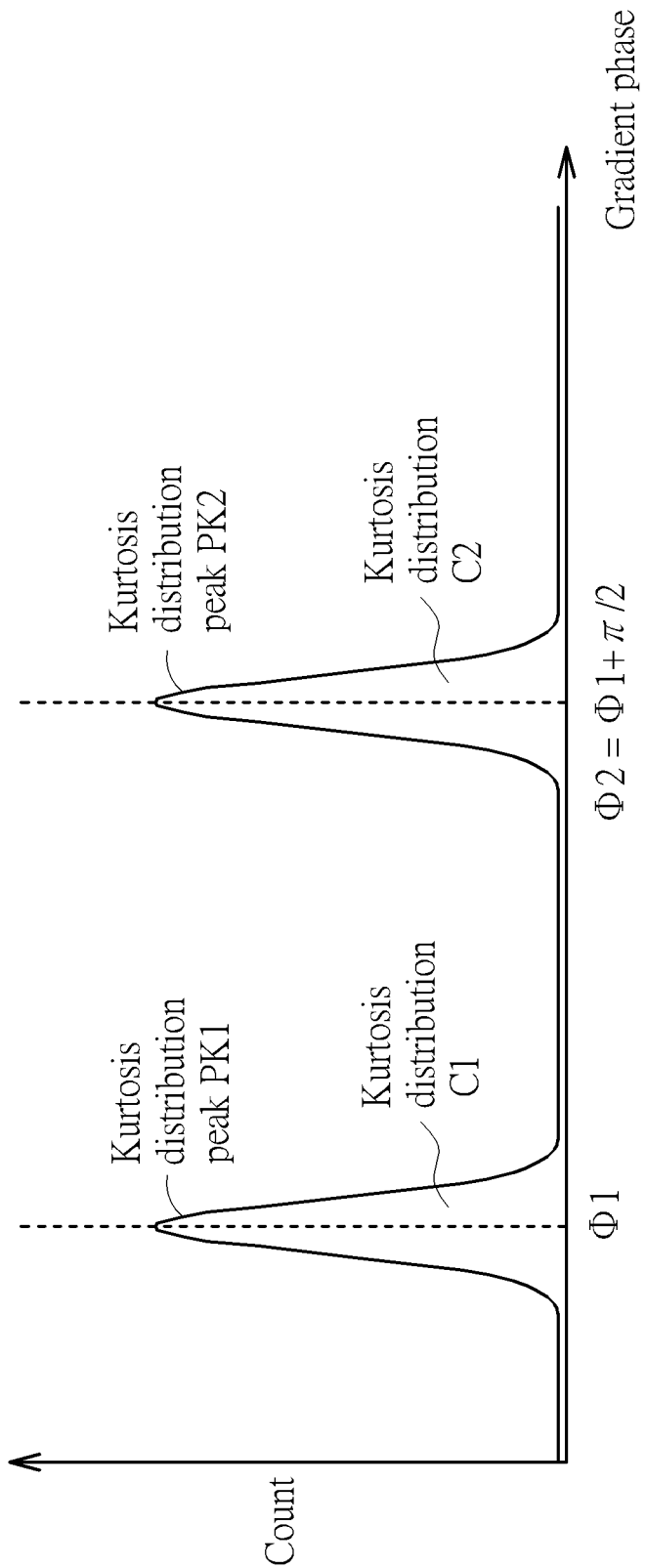
FIG. 10 is an illustration of a gradient phase distribution with two kurtosis distributions.

FIG. 10 is an illustration of a gradient phase distribution with two kurtosis distributions C1 and C2 of the barcode detection system 100. As previously mentioned, the processor 11 can generate the plurality of decision gradient phases from the gradient phases of the pixels by using the P gradient phase decision boundaries. Then, the processor 11 can generate the gradient phase distribution according to the plurality of decision gradient phases. In other words, the processor 11 can perform the statistical analysis process to the plurality of decision gradient phases (i.e., P possible phase patterns) of the pixels. For example, the number of decision gradient phases equal to zero (i.e., corresponding to the gradient phase decision boundary DB1) can be counted by the processor 11 according to the plurality of decision gradient phases of the pixels. Similarly, the number of decision gradient phases equal to $2\pi/8$ (i.e., corresponding to the gradient phase decision boundary DB2) can be counted by the processor 11 according to the plurality of decision gradient phases of the pixels, and so on. Finally, the gradient phase distribution can be generated by the processor 11. Specifically, the processor can generate the barcode format detection result as a two-dimensional barcode format when the gradient phase distribution has two kurtosis distributions C1 and C2, and two phases corresponding to two kurtosis distribution peaks PK1 and PK2 are separated by $\pi/2$, as illustrated below. Since the two-dimensional barcode includes a plurality of black segments and white segments in two perpendicular axes, gradient phases of the image correspond to dual angles. When the image of the two-dimensional barcode is not rotated, a gradient phase of each pixel corresponds to 0 or $\pi/2$. However, in a general case of the image of the two-dimensional barcode being captured by the camera 10, the image may be rotated. When the image of the two-dimensional barcode is rotated, the gradient phase of the each pixel corresponds toe or π/2+θ. θ is denoted as a rotation phase offset. Therefore, in FIG. 10, when the gradient phase distribution has two kurtosis distributions C1 and C2, two kurtosis distribution peaks PK1 and PK2 can be respectively detected to indicate two phases Φ1 and Φ2. When Φ1 and Φ2 are separated by π/2, the barcode can be detected as the two-dimensional barcode by the processor 11. The rotation phase offset θ can be derived as Φ1.

Figure 11:
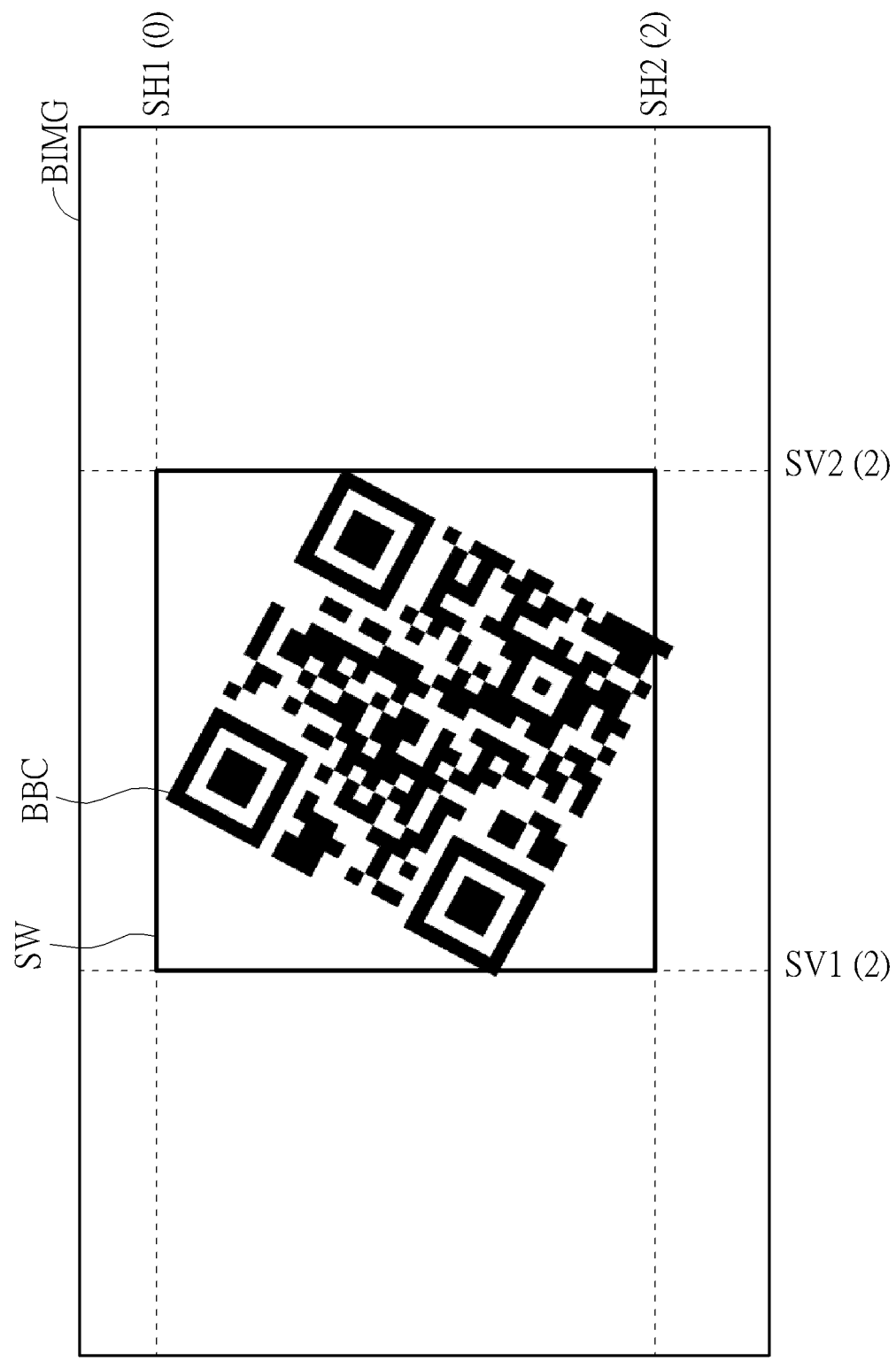
FIG. 11 is an illustration of locating the barcode region by the sliding window of FIG. 4.

FIG. 11 is an illustration of locating the barcode region by the sliding window SW. After the barcode format detection result is generated, the region covered by the sliding window SW can be expanded again to completely cover the binary barcode BBC according to the barcode format detection result. The expansion method is the same as the method in which the sliding window SW expanding to cover the core barcode region in FIG. 7, but a preselected value lower than the preset value is used to compare with the gray level flip count. As shown in FIG. 11, if the preselected value is 3, the gray level flip count corresponding to the horizontal scan line SH1 is 0, and the gray level flip count corresponding to the horizontal scan line SH2 is 2. Both of which are lower than the preselected value. The sliding window SW can stop expanding vertically. The gray level flip count corresponding to the vertical scanning line SV1 is 2, and the gray level flip count corresponding to the vertical scanning line SV2 is 2. Both of which are lower than the preselected value. The sliding window SW can stop expanding horizontally. At this point, the sliding window SW can cover and locate the binary barcode BBC. Finally, the barcode detection system 100 can extend the interval of the sliding window SW slightly according to the requirements to ensure that the barcode image can be properly covered.

Figure 12:
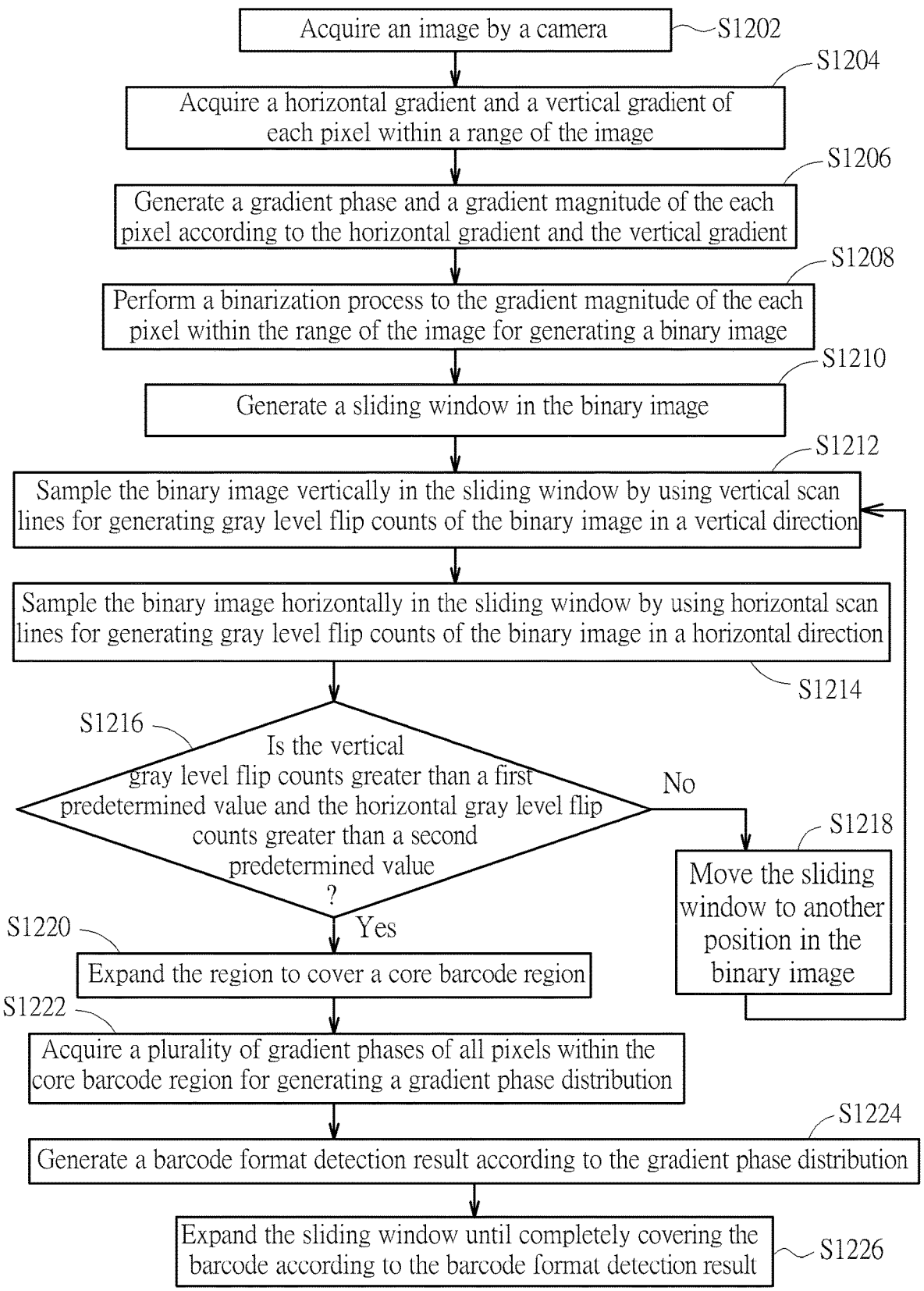
FIG. 12 is a flowchart illustrating the steps of the barcode detection method.

FIG. 12 is a flowchart illustrating the steps of the barcode detection method. The method includes the following steps:

S1202: Acquire an image by a camera 10;

S1204: Acquire a horizontal gradient and a vertical gradient of each pixel within a range of the image IMG;

S1206: Generate a gradient phase and a gradient magnitude of the each pixel according to the horizontal gradient and the vertical gradient;

S1208: Perform a binarization process to the gradient magnitude of the each pixel within the range of the image IMG for generating a binary image BIMG;

S1210: Generate a sliding window SW in the binary image BIMG;

S1212: Sample the binary image BIMG vertically in the sliding window SW by using V vertical scan lines for generating V gray level flip counts of the binary image BIMG in a vertical direction;

S1214: Sample the binary image BIMG horizontally in the sliding window SW by using H horizontal scan lines for generating H gray level flip counts of the binary image BIMG in a horizontal direction;

S1216: If V is greater than a first predetermined value and H is greater than a second predetermined value, determine a region covered by the sliding window SW to be a most intensive flip region and perform step S1220; If not, perform step S1218;

S1218: Move the sliding window SW to another position in the binary image BIMG; perform step S1212;

S1220: Expand the region to cover a core barcode region;

S1222: Acquire a plurality of gradient phases of all pixels within the core barcode region for generating a gradient phase distribution;

S1224: Generate a barcode format detection result according to the gradient phase distribution; and S1226: Expand the sliding window SW until completely covering the barcode BBC according to the barcode format detection result.

The two adjacent vertical scan lines are separated by N pixels, and the two adjacent horizontal scan lines are separated by M pixels. N, M, V and H are positive integers greater than 0.

In summary, a barcode detection system and method are provided by the embodiment of present invention. The method includes obtaining a gradient of each pixel in an image, generating a gradient phase and a gradient magnitude of each pixel according to the gradient, and binarizing the gradient magnitude of each pixel to generate a binary image, generating a sliding window on the image, sampling the binary image vertically and horizontally within the sliding window to generate the number of grayscale value variations in the vertical and horizontal directions, locating the most intensive flip region according to the grayscale variations in the vertical and horizontal directions, locating a core barcode region according to the most intensive flip region, capturing the gradient phase of the pixels in the core barcode region to generate a gradient phase distribution, generating a barcode format detection result according to the gradient phase distribution, and locating the barcode region according to the barcode format detection result. Therefore, the system and the method are highly reliable and able to reduce computational complexity and processing time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A barcode detection method for detecting a barcode, comprising:
   acquiring an image by a camera;
   acquiring a horizontal gradient and a vertical gradient of each pixel within a range of the image;
   generating a gradient phase and a gradient magnitude of the each pixel according to the horizontal gradient and the vertical gradient;
   performing a binarization process to the gradient magnitude of the each pixel within the range of the image for generating a binary image;
   generating a sliding window in the binary image;
   vertically sampling the binary image in the sliding window by using V vertical scan lines for generating V gray level flip counts of the binary image in a vertical direction, wherein two adjacent vertical scan lines are separated by N pixels;
   horizontally sampling the binary image in the sliding window by using H horizontal scan lines for generating H gray level flip counts of the binary image in a horizontal direction, wherein two adjacent horizontal scan lines are separated by M pixels;
   if V is greater than a first predetermined value and H is greater than a second predetermined value, determining a region covered by the sliding window to be a most intensive flip region;
   if the region covered by the sliding window is determined to be the most intensive flip region, then expanding the region to cover a core barcode region;
   acquiring a plurality of gradient phases of all pixels within the core barcode region for generating a gradient phase distribution;

generating a barcode format detection result according to the gradient phase distribution; and expanding the sliding window until completely covering the barcode according to the barcode format detection result;

wherein N, M, V and H are positive integers greater than 0.

2. The method of claim 1, wherein acquiring the horizontal gradient and the vertical gradient of the each pixel within the range of the image, is acquiring the horizontal gradient and the vertical gradient of the each pixel within the range of the image according to convolution results of a horizontal edge detection filter, a vertical edge detection filter, and brightness of the each pixel within the range of the image.

3. The method of claim 1, wherein performing the binarization process to the gradient magnitude of the each pixel within the range of the image for generating the binary image comprises:
   setting a threshold value; and
   comparing the threshold value with the gradient magnitude for mapping the gradient magnitude to a first gray level or a second gray level;
   wherein the first gray level is greater than the second gray level.

4. The method of claim 3, wherein the V gray level flip counts of the binary image in the vertical direction are V gray level flip counts switched between the first gray level and the second gray level in the vertical direction sampled by the V vertical scan lines.

5. The method of claim 3, wherein the H gray level flip counts of the binary image in the horizontal direction are H gray level flip counts switched between the first gray level and the second gray level in the horizontal direction sampled by the H horizontal scan lines.

6. The method of claim 1 further comprising:
   if V is less than the first predetermined value and/or H is less than the second predetermined value, moving the sliding window along the horizontal direction.

7. The method of claim 1 further comprising:
   if V is less than the first predetermined value and/or H is less than the second predetermined value, moving the sliding window along the vertical direction.

8. The method of claim 1, wherein expanding the region to cover a core barcode region comprises:
   expanding the sliding window horizontally;
   after expanding the sliding window horizontally, obtaining a gray level flip count of the binary image in the vertical direction of an expanded sliding window; and
   if the gray level flip count of the binary image in the vertical direction of the expanded sliding window is greater than a preset value, then expanding the sliding window horizontally.

9. The method of claim 1, wherein expanding the region to cover a core barcode region comprises:
   expanding the sliding window vertically;
   after expanding the sliding window vertically, obtaining a gray level flip count of the binary image in the horizontal direction of an expanded sliding window; and
   if the gray level flip count of the binary image in the horizontal direction of the expanded sliding window is greater than a preset value, then expanding the sliding window vertically.

10. The method of claim 1, wherein expanding the sliding window until completely covering the barcode according to the barcode format detection result comprises:
    expanding the sliding window horizontally;
    after expanding the sliding window horizontally, obtaining a gray level flip count of the binary image in the vertical direction of an expanded sliding window; and
    if the gray level flip count of the binary image in the vertical direction of the expanded sliding window is greater than a preselected value, then expanding the sliding window horizontally.

11. The method of claim 1, wherein expanding the sliding window until completely covering the barcode according to the barcode format detection result comprises:
    expanding the sliding window vertically;
    after expanding the sliding window vertically, obtaining a gray level flip count of the binary image in the horizontal direction of an expanded sliding window; and
    if the gray level flip count of the binary image in the horizontal direction of the expanded sliding window is greater than a preselected value, then expanding the sliding window vertically.

12. The method of claim 1, further comprising:
    setting P gradient phase decision boundaries, wherein two adjacent phase decision boundaries are separated by $2\pi/P$;
    generating a plurality of decision gradient phases from the gradient phases of all pixels within the image region by using the P gradient phase decision boundaries; and
    generating the gradient phase distribution according to the plurality of decision gradient phases;
    wherein P is an even integer greater than four.

13. The method of claim 1, wherein generating the barcode format detection result according to the gradient phase distribution comprises:
    generating the barcode format detection result as a one-dimensional barcode format when the gradient phase distribution has only one kurtosis distribution.

14. The method of claim 1, wherein generating the barcode format detection result according to the gradient phase distribution comprises:
    generating the barcode format detection result as a two-dimensional barcode format when the gradient phase distribution has two kurtosis distributions and two phases corresponding to two kurtosis distribution peaks are separated by $\pi/2$.

15. A barcode detection system comprising:
    a camera configured to capture an image;
    a processor coupled to the camera and configured to process the image in order to generate a barcode format detection result; and
    a memory coupled to the processor and configured to buffer image processing data;
    wherein the processor acquires an image captured by the camera, acquires a horizontal gradient and a vertical gradient of each pixel within a range of the image, generates a gradient phase and a gradient magnitude of the each pixel according to the horizontal gradient and the vertical gradient, performs a binarization process to the gradient magnitude of the each pixel within the range of the image for generating a binary image, generates a sliding window in the image, vertically samples the binary image in the sliding window by using V vertical scan lines for generating V gray level flip counts of the binary image in a vertical direction, horizontally samples the binary image in the sliding window by using H horizontal scan lines for generating H gray level flip counts of the binary image in a horizontal direction, determines a region covered by the sliding window to be a most intensive flip region if V and H are greater than predetermined values, expands the region to cover a core barcode region, acquires a plurality of gradient phases of all pixels within the core barcode region for generating a gradient phase distribution, generates a barcode format detection result according to the gradient phase distribution, and expands the sliding window until completely covering the barcode according to the barcode format detection result; and wherein N, M, V and H are positive integers greater than 0.

* * * * *